US006481318B1

(12) United States Patent
Kinigakis et al.

(10) Patent No.: US 6,481,318 B1
(45) Date of Patent: Nov. 19, 2002

(54) CUTTING KNIFE ARRANGEMENT FOR USE WITH SOFT MATERIALS

(75) Inventors: Panagiotis Kinigakis, Mount Prospect, IL (US); Krzysztof Mosiewicz, Glenview, IL (US)

(73) Assignee: Kraft Food Holdings, Inc., Northfield, IL (US)

( * ) Notice: Subject to any disclaimer, the term of this patent is extended or adjusted under 35 U.S.C. 154(b) by 87 days.

(21) Appl. No.: 09/629,559

(22) Filed: Jul. 31, 2000

(51) Int. Cl.7 .............................. B23B 1/00; B23B 5/00

(52) U.S. Cl. .............................. 82/1.11; 82/46; 407/35; 407/46

(58) Field of Search ............................ 82/1.11, 46, 47; 407/35, 40, 41, 43, 47, 49, 46, 118, 119

(56) References Cited

U.S. PATENT DOCUMENTS

| | | | | |
|---|---|---|---|---|
| 604,776 A | | 5/1898 | Morton | |
| 2,377,773 A | | 6/1945 | Francis | 29/105 |
| 3,017,912 A | | 1/1962 | Sybertz et al. | 144/230 |
| 3,555,644 A | | 1/1971 | Owen | 29/105 |
| RE27,192 E | | 10/1971 | Milewski | 29/105 |
| 3,636,602 A | | 1/1972 | Owen | 29/95 |
| 3,791,429 A | | 2/1974 | Morris | 144/218 |
| 3,818,562 A | | 6/1974 | Lacey | 29/105 |
| 3,827,119 A | | 8/1974 | Bennett | 29/105 R |
| 3,938,231 A | | 2/1976 | Hopkins | 29/105 A |
| 3,946,474 A | * | 3/1976 | Hahn et al. | 29/105 R |
| 3,955,259 A | | 5/1976 | Gustafsson | 29/95 R |
| 4,318,647 A | | 3/1982 | Erkfritz | 408/153 |
| RE30,908 E | | 4/1982 | Friedline et al. | 407/114 |
| 4,583,886 A | | 4/1986 | Drescher | 407/40 |
| 4,597,695 A | | 7/1986 | Johnson | 407/113 |
| 4,645,386 A | | 2/1987 | Smith | 407/113 |
| 4,733,995 A | | 3/1988 | Aebi | 407/34 |
| 4,754,789 A | | 7/1988 | Jonsson | 144/241 |
| 4,993,891 A | | 2/1991 | Kaminiski et al. | 407/42 |
| 5,033,916 A | | 7/1991 | Dunklau | 407/33 |
| 5,085,542 A | | 2/1992 | Nakayama et al. | 407/114 |
| 5,133,394 A | | 7/1992 | Landtwing | 144/230 |
| 5,439,039 A | | 8/1995 | Bradstreet, Jr. et al. | 144/230 |
| 5,647,419 A | * | 7/1997 | Stewart | 144/230 |
| 5,776,588 A | * | 7/1998 | Moriguchi et al. | 428/210 |
| 5,957,755 A | | 9/1999 | LaFlamme | 451/48 |

* cited by examiner

*Primary Examiner*—Henry Tsai
(74) *Attorney, Agent, or Firm*—Fitch, Even, Tabin, & Flannery

(57) ABSTRACT

A cutting knife arrangement employs a plurality of cutting knife inserts mounted on a common circular cylinder. Cutting knife inserts are mounted on a holder device secured to the outer periphery of the cylinder. The cutting knife inserts have a rectangular cross-section with each corner edge comprising a cutting edge. By indexing the cutting knife insert, different cutting edges of the same insert can be presented for use in a cutting operation.

17 Claims, 5 Drawing Sheets

CUTTING KNIFE ARRANGEMENT FOR USE WITH SOFT MATERIALS

BACKGROUND OF THE INVENTION

1. Field of the Invention

The present invention pertains to cutters, and in particular to improvements in rotary cutting knives.

2. Description of the Related Art

Substantial improvements have been made in machine cutters having indexable inserts. These arrangements are designed for machining relatively hard materials, such as metal. Such arrangements have been found to be unsuitable for use in cutting relatively soft materials, such as plastic and plastic coated products. A need exists for improvements in processing soft products, especially soft food products such as cheese.

SUMMARY OF THE INVENTION

It is an object of the present invention to provide a cutting knife arrangement with indexable inserts offering improved performance for use with continuous webs of relatively soft materials, such as plastic and plastic coated products.

Another object of the present invention is to provide improved cutting knife arrangements in which multiple cutting knives are arranged on a common supporting cylinder.

A further object of the present invention is to provide cutting knife arrangements of the type described above which substantially reduce the amount of maintenance and down-time required for maintaining cutting edges of the knives.

Yet another object of the present invention is to provide an improved cutting knife arrangement of the type described above, in which the cutting knives are economically produced using inexpensive materials and processes.

These and other objects of the present invention are provided in a rotatable cutting knife arrangement, comprising:

a rotary body;

a plurality of cutting knife inserts;

the body including an outer peripheral portion including a plurality of cavities, for at least partially receiving said cutting knife inserts, with the cavities defined by said adjacent cavity walls for supporting adjacent faces of said cutting knife inserts;

said cutting knife inserts comprising blocks of cutting material having a generally rectangular cross-sectional shape and forming cutting edges at the corners of the rectangular cross-section;

said cavity walls aligned along non-radial, non-tangential directions with respect to said rotary body so as to align said cutting knife insert, with a second cutting edge outwardly protruding for cutting operations;

said cutting knife insert and said body cavities cooperating so as to allow said cutting knife insert to be indexed to present a different outwardly protruding cutting edge when said cutting knife insert is removed and repositioned with respect to said body cavities; and said cavity walls configured so as to receive a corner portion of said cutting knife insert, so as to maintain one corner edge of the cutting knife insert out of contact with the support surfaces.

Objects of the present invention are also provided in apparatus for use in preparing a continuous web of food product for packaging, the food product including a soft food wrapped in a continuous wrapper, the apparatus comprising:

a rotary anvil having an outer surface; and a rotary cutting knife arrangement opposite said rotary anvil and spaced therefrom to form a nip for receiving said web;

said rotary cutting knife arrangement including a rotary body, a plurality of cutting knife inserts, said cutting knife inserts comprising blocks of cutting material having a generally rectangular cross-sectional shape and forming cutting edges at the corners of the rectangular cross-section, the body including cavity walls for supporting adjacent faces of said cutting knife inserts, said cavity walls aligned along non-radial, non-tangential directions with respect to said rotary body so as to align said cutting knife insert, with a second cutting edge outwardly protruding for cutting operations;

said cutting knife insert and said cavity walls cooperating so as to allow said cutting knife insert to be removed and repositioned with respect to said cavity walls so as to present a different cutting edge to said rotary anvil, and said cavity walls configured so as to receive a corner portion of said cutting knife insert, so as to maintain one corner edge of the cutting knife insert out of contact with the support surfaces; and said rotary anvil and said rotary cutting knife arrangement cooperating to sever a wrapped portion of said soft food from said web.

Further objects of the present invention are attained in apparatus for producing packaged individual food portions in which spaced-apart portions of a soft food product, disposed within a continuous wrapper web and separated by sealed portions of the wrapper web, are formed by severing the wrapper web, the apparatus comprising:

a rotary anvil having an outer surface; and a rotary cutting knife arrangement, carrying a plurality of cutting knife inserts comprising blocks of cutting material having a generally rectangular cross-sectional shape and forming cutting edges at the corners of the rectangular cross-section, said rotary cutting knife arrangement opposing said rotary anvil and spaced therefrom to form a nip for receiving said web;

said rotary cutting knife arrangement including a rotary body having cavity walls for supporting adjacent faces of said cutting knife inserts, said cavity walls aligned along non-radial, non-tangential directions with respect to said rotary body so as to align said cutting knife inserts, with a first cutting edge outwardly protruding so as to cooperate with said rotary anvil, said cutting knife inserts and said cavity walls cooperating so as to allow said cutting knife inserts to be removed and repositioned with respect to said cavity walls so as to present a different cutting edge to said rotary anvil, and said cavity walls configured so as to receive a corner portion of said cutting knife insert, so as to maintain a second corner edge of the cutting knife insert out of contact with the support surfaces; and said rotary anvil and said rotary cutting knife arrangement cooperating to pass portions of the wrapper web containing the soft food product and to sever sealed portions of said wrapper web.

Still further objects of the present invention are provided in a method of processing a continuous web of food product comprising spaced apart portions of soft food wrapped in a continuous wrapper, comprising the steps of:

providing an anvil roller;

providing a cutting roller having a plurality of indexable cutting knife inserts protruding toward the anvil roller;

forming a nip between the anvil roller and cutting roller;

passing the web of food product through the nip;

cutting the web at points between portions of soft food to separate a portion of food product from the web; and indexing the cutting knife insert at periodic intervals to present a new cutting edge for severing the web.

DETAILED DESCRIPTION OF THE PREFERRED EMBODIMENT

Figure 1:
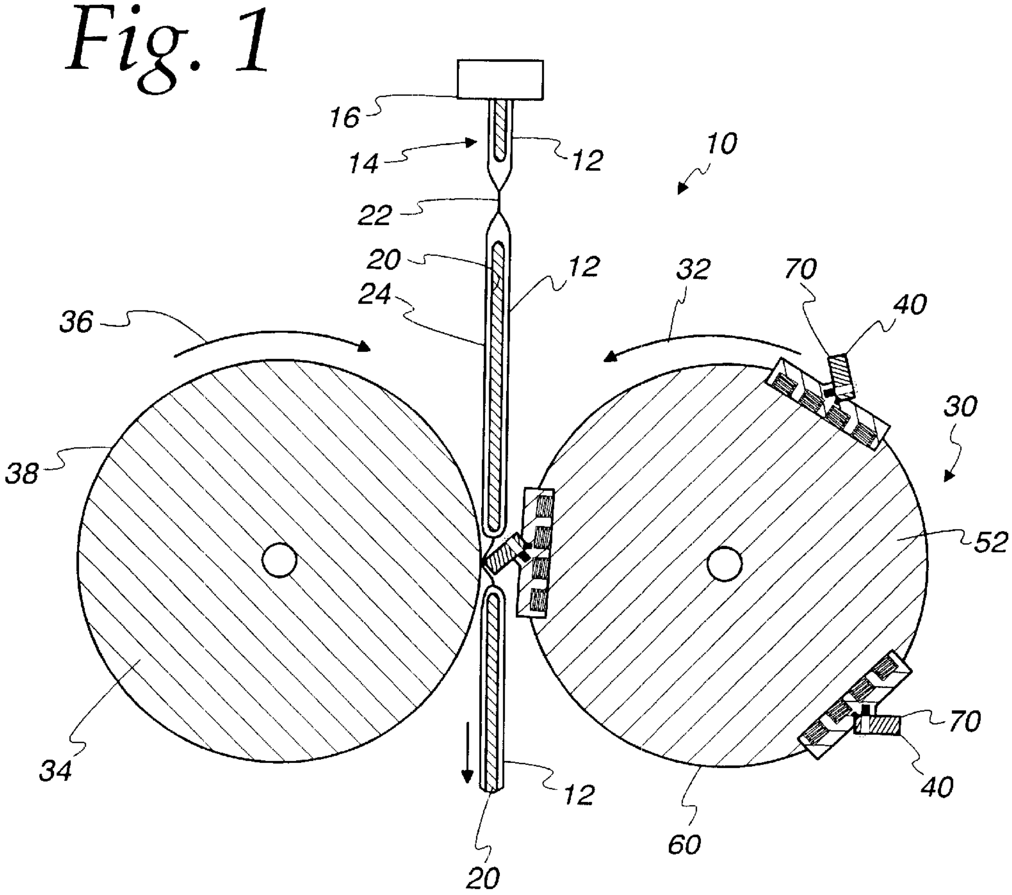
FIG. 1 is a cross-sectional view showing a web cutting system according to principles of the present invention.

Referring now to the drawings, and initially to FIG. 1, a cutting arrangement is generally indicated at 10. The assembly provides rotary cutting action to sever individual portions 12 from a continuous web 14, preferably of wrapped soft material. As will be seen herein, the present invention can be used with virtually any soft material but has found immediate commercial acceptance in the food processing industry where web 14 comprises a continuous ribbon of soft food material, such as cheese, wrapped in a continuous inner wrapper of plastic film or other polymer material. Preferably, web 14 has passed a voider/sealer station 16 where the continuous ribbon of cheese 20 is separated into individual portions, separated by intervening sealed portions 22 of a continuous web of plastic or other polymer wrapper material 24. As indicated in FIG. 1, individual wrapped portions of cheese 20 are produced with the cutting of web 14 at sealed portions 22. If desired, cutting arrangement 10 could be used to sever wrapped or unwrapped assemblies of other soft materials.

Included in cutting arrangement 10 is a cutting assembly generally indicated at 30, which is mounted for rotation in the direction of arrow 32. Arrangement 10 also includes rotary anvil 34 mounted for rotation in the direction of arrow 35 and having an outer surface 38. Cutting assembly 30 carries a plurality of cutting knife positions, each having an active cutting edge 40. As the cutting edges 40 rotate in the direction of arrow 42 they briefly contact or come very close to anvil surface 38, thereby cutting any intervening material disposed in the gap between cutting assembly 30 and anvil 34. In the preferred embodiment, rotation of cutting assembly 30 and the linear feed rate of product web 14 are coordinated such that cutting occurs at the sealed portions 22. The anvil roller and cutting cylinder can be either synchronized or not. In order to reduce anvil degradation due to chattering or nicking caused by the cutting insert, it is generally preferred that the rotations of the anvil and the cutting cylinder are not synchronized.

Figure 12:
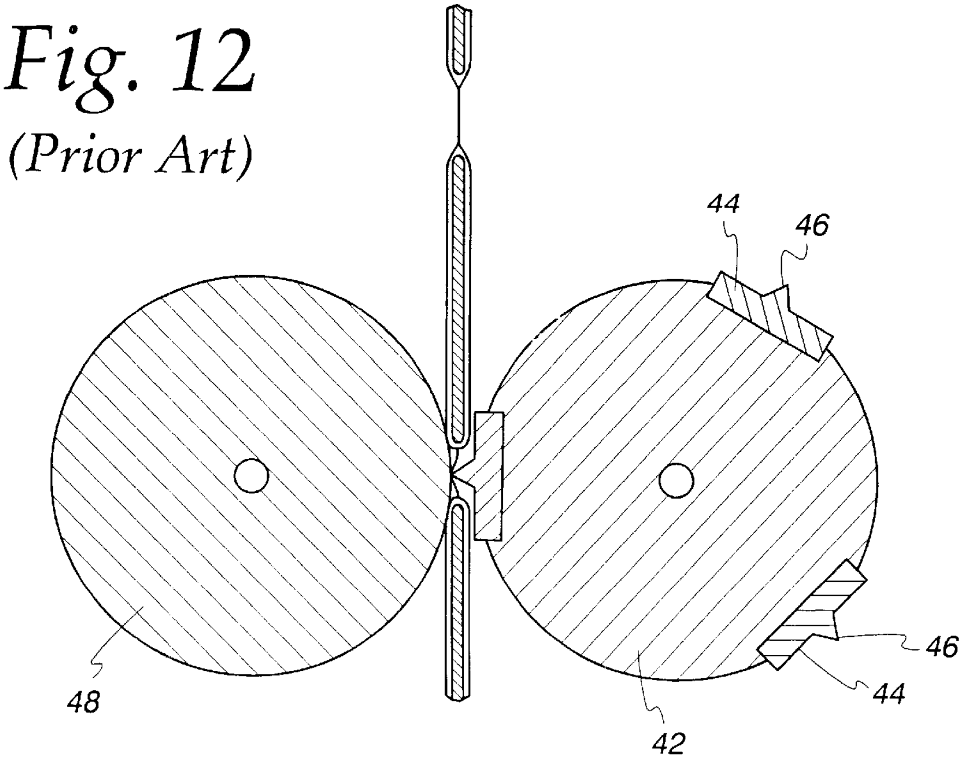
Fig. 12 (Prior Art)
FIG. 12 shows a prior art web cutting assembly.

FIG. 12 shows a prior art cutting arrangement with a cutting wheel 42 carrying cutting tools 44 having integrally formed cutting tips or cutting edges 46. Over time, with continued use, the cutting edges 46 become worn, requiring servicing. In order to restore the required sharpness to the cutting edges 46, tools 44 are removed from wheel 42 for sharpening at a remote location. The newly formed cutting edges are lowered with respect to the position of the original cutting edge of cutting tool 44, due to the removal of material during the sharpening operation. As a result, the newly formed or restored cutting edges are shifted slight amounts toward the center of wheel 42, resulting in an undesirable enlarged nip when the cutting tool is brought into cutting position immediately opposite the anvil roller 48. As a result, shims had to be added beneath the cutting tools 44 to raise the renewed cutting edges 46 with respect to the surface of wheel 42. Shimming of the cutting tools 44 is a prolonged and laborious activity. Further, the set of cutting tools 44, when returned from the sharpening procedure, have different cutting heights, requiring each individual cutting tool 44 to be individually shimmed, adding to the difficulty and down time of the servicing operation. As will be seen herein, substantial improvements are made by the present invention in overcoming these difficulties.

Figure 2:
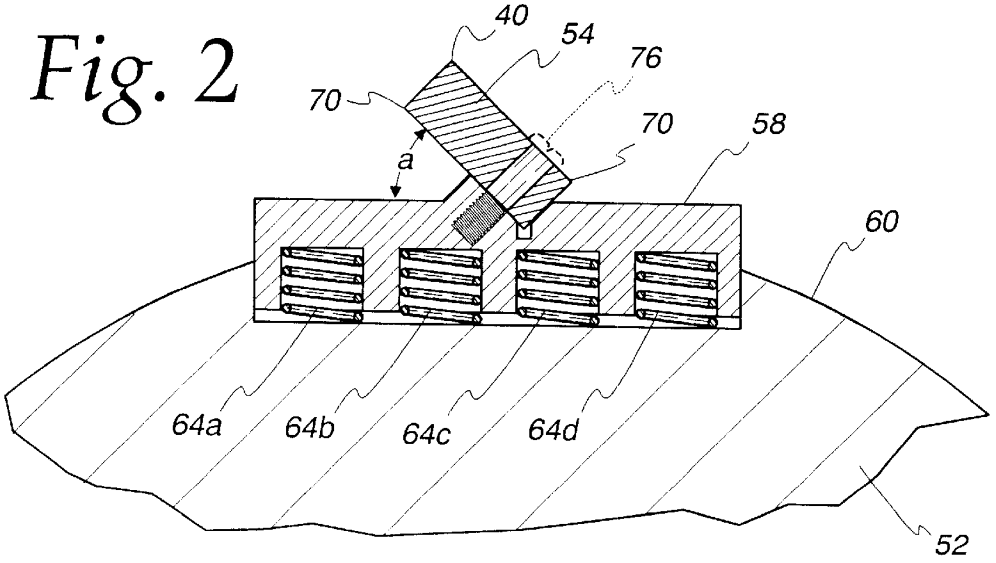
FIG. 2 is a fragmentary view thereof, shown on an enlarged scale.

Referring to FIG. 2, a cutting knife position is shown in greater detail. The cutting knife position is located at an outer peripheral portion of circular cylinder 52. The active or operable cutting edge 40 appears at one corner of a cutting knife insert 54. If desired, the cutting knife insert 54 could be mounted directly in the periphery of circular cylinder 52. However, it is preferred in carrying out the present invention that a separate holder device 58 be mounted in a recess formed in the outer surface 60 of circular cylinder 52. Holder device 58 in turn provides releasable mounting for cutting knife insert 54. Preferably, the holder device 58 is resiliently mounted to circular cylinder 52. The holder device is secured to circular cylinder 52 using conventional arrangements, including screw fasteners as well as a keyed sliding fit in which holder devices 58 are slid into keyway slots formed in circular cylinder 52. In the arrangement shown in FIG. 2, a plurality of recesses are formed in the bottom portion of the holder device, to receive coil springs 64*a*–64*d*. If desired, the outer springs 64*a*, 64*d* and the surrounding body portions of holder device 58 can be eliminated in the manner shown in FIG. 9 to provide a holder device of smaller dimensions.

Figure 3:
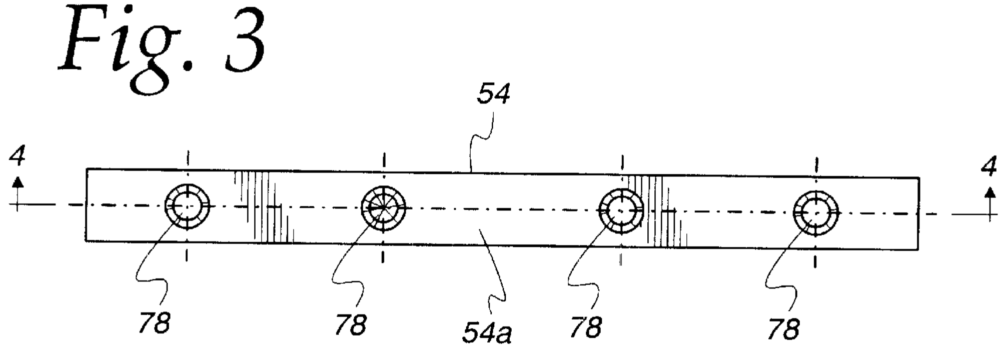
FIG. 3 is a top plan view of the cutting knife insert used therewith.
Figure 4:
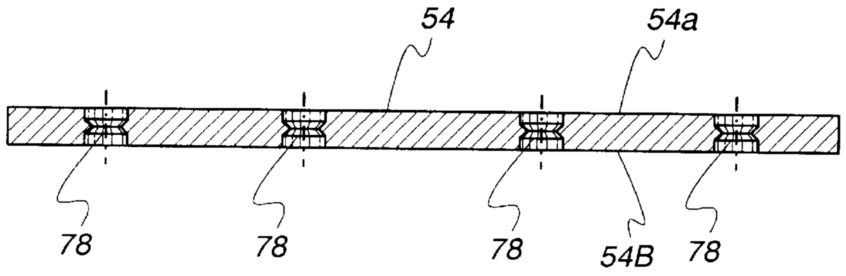
FIG. 4 is cross-sectional view taken along the line 4—4 of FIG. 3.
Figure 5:
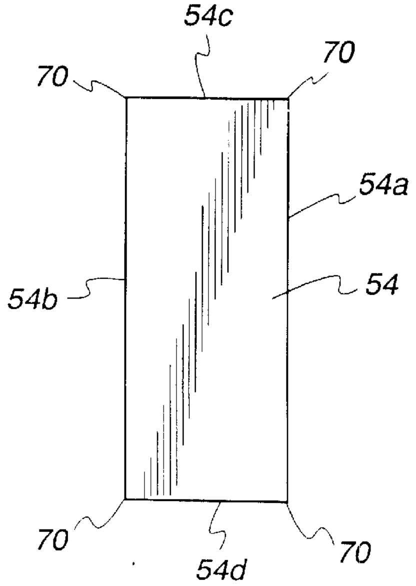
FIG. 5 is an end view of the cutting knife insert of FIG. 3.

Turning now to FIGS. 3–5, cutting knife insert 54 can be seen to have four rectangular outer faces and a rectangular end shape. Preferably, the cross-sectional shape of cutting knife insert 54 (indicated in FIGS. 2 and 5) is maintained throughout its length. As shown, the cross-sectional shape of the cutting knife insert can comprise an elongated rectangle with opposed major faces 54*a*, 54*b* and opposed minor faces 54*c*, 54*d*. The outer corners of the cutting knife insert, each comprising a cutting edge, are indicated by the reference numeral 70. When the cutting edge 70 is located in the outwardmost protruding position, shown for example in FIG. 2, the edge is referred to by reference numeral 30 indicating that the edge is placed in the active cutting position. As will be seen herein, it is most preferred that the cutting insert have a generally square cross-sectional shape, shown for example in FIG. 11, although other cross-sectional shapes can be employed, if desired.

It will now be appreciated that the cutting knife insert 54 can be indexed (i.e., rotated and/or flipped over) to place a different cutting edge in the operative cutting position. In the preferred embodiment, with the cutting knife insert having a rectangular cross-sectional shape, four cutting edges are provided by each cutting insert. Accordingly, the useful life of the cutting knife insert 54 is extended at least four times over the life of prior art cutting tool 44. Further improvements are made to extend the useful life of the cutting knife insert. In the preferred embodiment, the outer portions of the cutting knife inserts shown in FIGS. 1–11 are hardened with an outer hardening layer of ZrN, TiN, CrN, or ARCLYATHON material. If desired, hardening can be localized at the corners forming the cutting edges of the insert. The hardening materials discussed here are chosen based upon the composition of the body of the cutting knife insert and compatibility with the anvil surface as well as the particular application to which the present invention is put.

In the preferred embodiment, cutting knife insert 54 is made of VINADUS-10 alloy with an outer hardening layer of ZrN applied by Enhanced Cathodic Arc Plasma Deposition. As will be discussed later, herein, a balance must be struck when choosing the hardness of the cutting knife inserts. For example, it is recognized that the cutting knife insert may forcefully contact the outer surface of the anvil roller with sufficient impact to cause a notching, grooving or chattering disruption to the initially smooth anvil surface. Over time, these and other similar distortions would render irregular the cutting pressure applied to the web. One solution to the problem would be to soften the hardening layer on the cutting knife insert, although this would lead to accelerated wear on the cutting edges. Another solution would be to alter the angle a between the cutting knife insert and the upper surface of the holder, as can be seen, for example, in FIGS. 2 and 11. Testing of different angles a can be carried out in an economical manner, as will be explained below, owing to the simplified construction of the holder provided by the present invention.

With the present invention, the preferred embodiment provides four changes of cutting knife edges, with the cutting knife insert thereafter being removed from the cutting assembly. The cutting knife insert can be re-sharpened, if desired, but preferably is discarded in favor of a newly produced cutting knife insert held to close tolerance dimensions in order to reduce set up time for installation of a new cutting knife insert. For the present invention, such set up time and calibration (i.e., shimming of the cutting knife insert) occurs only once a year and requires approximately one hour to complete. In contrast, the prior art cutting knife assembly shown in FIG. 12 required sharpening every five to ten days (and hence set up and calibration every five to ten days), with approximately two hours being required for each set up operation. With the present invention, the cutting knife insert can be originally manufactured to very close tolerance dimensions at a practical cost. This results in each cutting edge giving exactly (within production tolerances) the same distance between each cutting edge of the insert and the surface of anvil 34. As shown for example in FIG. 2, cutting knife insert 54 is quickly and easily removed from holder device 58, being secured thereto with machine screws 76. With reference to FIG. 3, a series of four holes 78 are formed in the cutting knife insert to receive screws 76.

Figure 9:
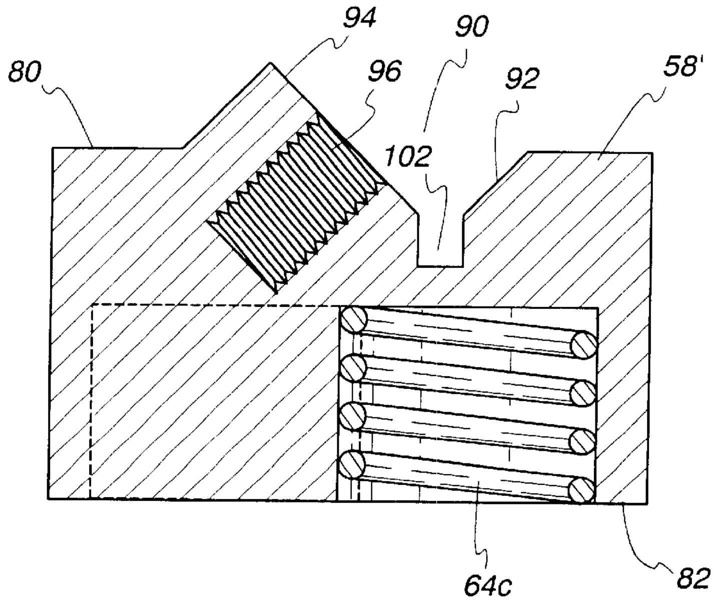
FIG. 9 is a cross-sectional view taken along the line 9—9 of FIG. 7.
Figure 10:
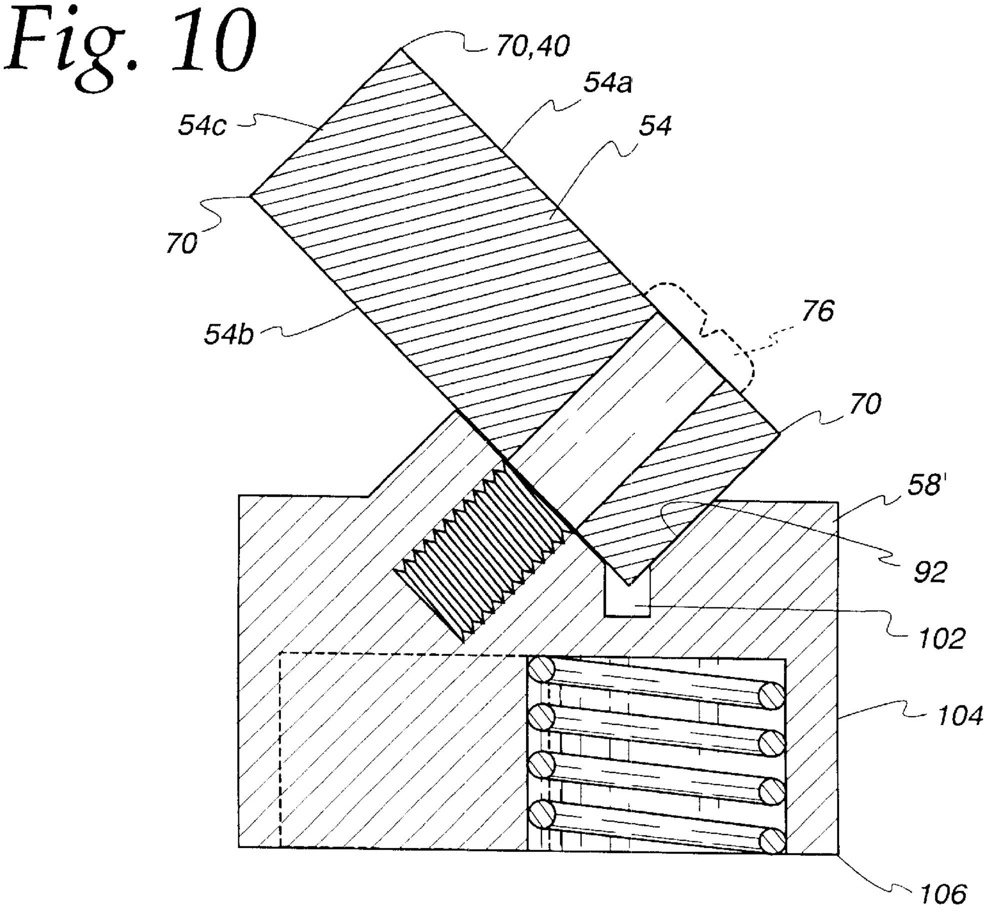
FIG. 10 is view similar to that of FIG. 9, but showing the cutting knife insert installed in the holder.

Referring to FIGS. 9 and 10, a smaller sized holder device 58' is shown. As mentioned, holder device 58' is identical to holder device 58 of FIG. 2 except for shortening in the lateral dimension whereby only two series of cavities for springs 64 are provided. With the holder device 58' of reduced size, the milling operation required on circular cylinder 52 is reduced, thereby contributing to further cost savings.

Figure 6:
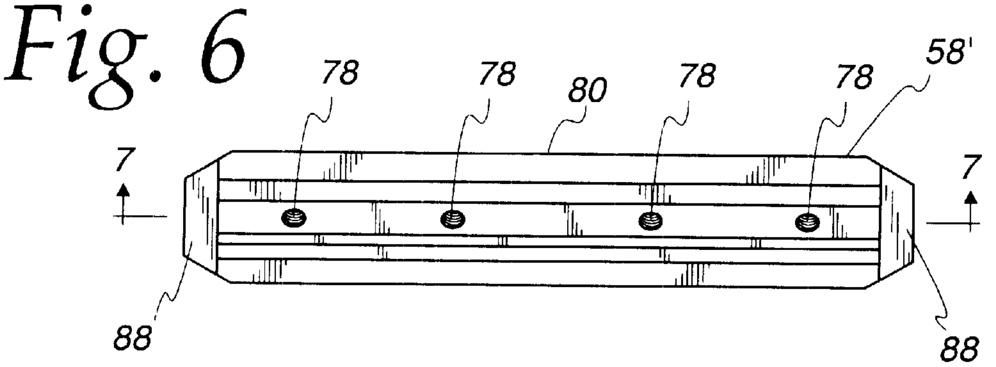
FIG. 6 is a top plan view of a holder for the cutting knife insert.
Figure 7:
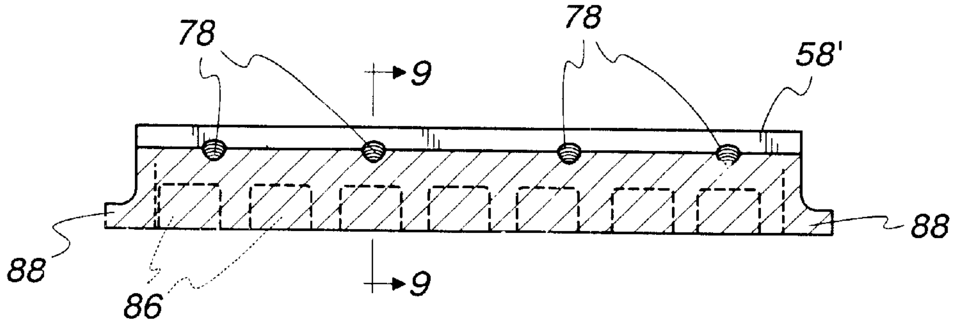
FIG. 7 is a cross-sectional view taken along the line 7—7 of FIG. 6.
Figure 8:
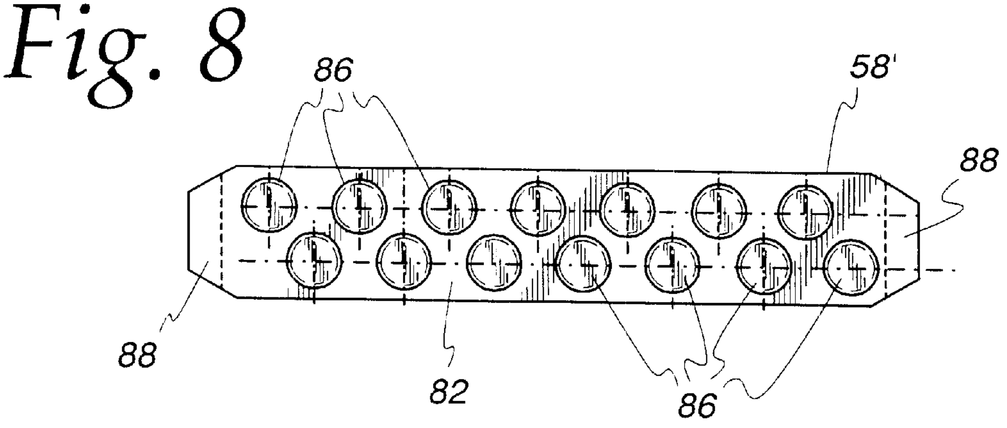
FIG. 8 is a bottom plan view of the cutting knife holder.

As can be seen in FIG. 9, for example, holder device 58 has a generally rectangular cross-section which is preferred for the ready secure engagement of the holder device within the body of the circular cylinder 52. Holder device 58' includes an upper surface 80 (as shown in FIG. 6) and an opposed bottom surface 82 (shown in FIG. 8). As can be seen for example in FIG. 8, a series of circular recesses 86 are formed in the bottom surface 82. The recesses 86 are arranged in two staggered rows, but other patterns may be employed, as well. At least some of the recesses 86 receive resilient biasing members, preferably in the form of coil springs 64. As indicated in FIGS. 6–8, mounting ears 88 are added at opposed ends of the holder device.

The cutting knife arrangement according to principles of the present invention has found immediate commercial application in the food packaging art. It was discovered that the cut from edge-to-edge was uneven with different portions of the cut line exhibiting varying cutting pressures. The springs employed in biasing the holder were re-designed and substitute springs with different compression ratios were employed. As can be seen from the holder construction shown, for example, in FIGS. 7 and 8, the present invention allows biasing springs to be readily exchanged, with minimal down time to the production line. As indicated in FIG. 7, each of the spring-receiving holes 86 can be made of constant depth from one end of the holder to the other. However, it was found advantageous of increase the depth of some of the holes located adjacent the ends of the holder, thus altering the edge-to-edge profile of pressure forces applied to the cutting blade. Further, it was found advantageous to provide biasing springs in all of the holes of the holder to better define a continuous pressure profile.

Due to the simplified construction of cutting arrangements, and especially the holder employed therein, further advantages in a practical high speed production line are obtained. Whenever a cutting arrangement is re-designed, concerns are raised as to uneven anvil wear. In developing commercial embodiments according to principles of the present invention, concern was raised that the cutters may, over time, cause a deformation of the outer surface 38 of anvil roller 34 in the form of notches, grooves or other depressions in the outer surface of the anvil roller. It is generally preferred that the rotation of the anvil roller not be synchronized to the rotation of the cutting cylinder 52, as this will reduce the rate of any damage to the anvil surface that may be experienced during high speed production line operation. In the preferred embodiment, a “softer” or less extreme hardening coating of titanium was employed for the cutting inserts. This choice of hardening material proved to be adequate to obtain a good balance between cutting edge life and anvil surface degradation. If harder web materials are required to be cut, a more extreme hardening coating, such as that made of zirconium, may be required. This in turn may require a more extreme hardening coating to be applied to the surface 38 of the anvil roller 34. No damage to the surface of the anvil roller has been observed, even with hardened cutting inserts, and it is expected that the angle of the cutting insert shown, for example, in FIGS. 2 and 11, contribute to the absence of anvil roller surface deformation. With the present invention, achieving a practical balance between anvil surface wear and knife edge wear can be readily investigated by changing the spring values and perhaps the number of springs employed in cavities 86 formed in the holder.

Referring again to FIG. 9, a depression or cavity 90 is formed in upper surface 80 to receive the bottom portion of cutting knife insert 54 (see FIG. 10). In the preferred embodiment, cavity 90 has a general V-shape throughout, although other shapes are possible. In the preferred embodiment, cavity 90 is formed by a pair of cavity walls 92, 94, with cavity wall 94 protruding a greater amount than cavity wall 92. A threaded recess 96 is formed in cavity wall 94 to receive a machine screw or the like threaded fastener 76 (see FIG. 10).

As indicated in FIG. 10, with cutting knife insert 54 installed in holder device 58', the lowermost cutting edge of insert 54 is received in a recess 102 which separates cavity walls 92, 94. Recess 102 is preferred, as it ensures unnecessary wear on the lowermost corner of the cutting knife insert is avoided. Other arrangements can be provided, if desired. For example, the holder device 581 can be provided with a strip of softer material at the junction of cavity walls 92, 94. By removing the four screws 76, cutting knife insert 54 in FIG. 10 can be temporarily removed from holder device 58' and can be flipped end-to-end rotated or otherwise indexed to present a fresh cutting edge 70 at the operative cutting position 40.

Turning again to FIG. 5, the holder according to principles of the present invention is strong enough to accommodate cutting knife inserts having an elongated rectangular cross-section with the major faces 54*a*, 54*b* ranging between 1.1 and 2-½ times the length of the minor faces 54*c*, 54*d*. With reference to FIG. 10, at the moment of cutting action, when contact or near-contact is made with anvil 34, a force component is transmitted through the arrangement shown in FIG. 10 generally parallel to the major faces 54*a*, 54*b*. This force component is resolved at the smaller cavity wall 92 and is thereafter transmitted to the side face 104 and outer corner 106 of mounting device 58'. The component force is thereby adequately transmitted to the body of circular cylinder 52. Reaction forces in other directions are resolved in part by threaded fastener 76 acting either across the outer surface of the fastener or, along the axial length of the fastener. Bending of the fastener is prevented by the intimate engagement of the outer surfaces of cutting knife insert 54 and cavity walls 92, 94, making the greatest use of the inherent strength of fastener 76.

Figure 11:
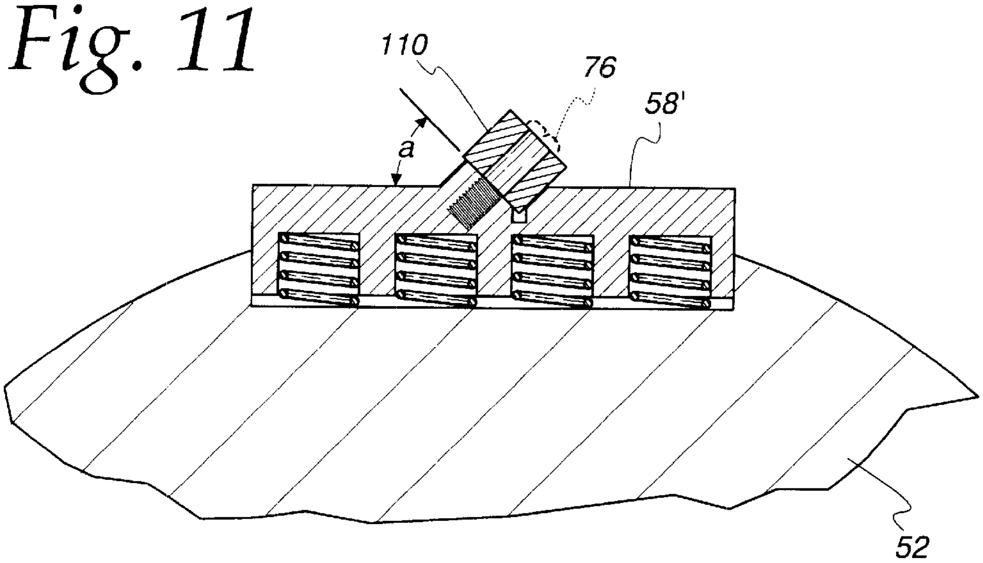
FIG. 11 is an alternative embodiment of a cutting knife insert and holder assembly.

While cutting knife inserts having surface ratios ranging between 1.1:1 and 2.5:1 are possible, other cross-sectional shapes, especially generally square cross-sectional shapes, are contemplated by the present invention, as well. For example, FIG. 11 shows the most preferred cutting knife insert 110 of generally square cross-section. As can be seen for example in FIG. 11, the angle a is formed between the cutting insert and the upper surface of the holder, which is generally parallel to a tangent line of cylinder 52. Most preferably, angle a ranges between 40 and 50 degrees and is most preferably 45 degrees. Other cutting angles are possible, although it is believed that the preferred range of cutting angles, and in particular the most preferred cutting angle of 45 degrees, is an important factor in reducing deformation of the anvil roller surface.

Cutting knife inserts having three, five or other numbers of sides (with corresponding numbers of cutting edges) can be employed as well. It is generally preferred that the receiving cavities for the cutting knife inserts have the number of walls necessary to adequately secure the portion of the cutting knife insert received in the cavity. Substantial portions of the cutting knife cross-section may protrude beyond the periphery of cutting cylinder 52. If desired, the cylinder can be provided with a cavity in the form of a groove for sliding reception of the majority of the holder, with only the active cutting edge of the cutting knife being exposed.

As noted in the above, cutting arrangements according to principles of the present invention are comprised of multiple components, including the cutting insert and the holder. Based upon the monolithic construction of the prior art, shown in FIG. 12, design concerns were initially focused on the ability of multiple component cutting arrangements to withstand the rigors of continuous high speed production. As indicated in the rough scale of the appended drawings, relatively small cross-section fasteners are used to secure the cutting insert to the holder. The fasteners 76 shown in the figures provide rigid supporting of the cutting inserts, and it was not found necessary to use larger fasteners, or a greater number of fasteners than those shown in the drawings. The preferred holder, shown in FIGS. 6–11 of the drawings, has an overall active width (excluding mounting ears 88) of approximately 4.25 inches and a maximum height of approximately 0.6 inch. The holes 78, which receive threaded fasteners 76, were spaced at approximately 1.0 inches with a larger center spacing of 1.25 inches. The holes were drilled and tapped to receive conventional 8–36 screws which were threadingly engaged with the holder over a distance of approximately 3⁄16 inch. The holes 86 to receive the spring biasing members, in the preferred embodiment, were sized at approximately 25⁄64ths of an inch and, in a given row, had center spacings of approximately 0.563 inch, with the rows being spaced at approximately 0.375 inch. The cutting insert of the preferred embodiment, shown in FIG. 11, has a square cross-section of approximately 0.375 inch. In the preferred embodiment, only two rows of springs were found necessary to adequately support the holder and cutting knife insert. In the preferred embodiment, the support surface 94 (with gap 102) had a width of 0.368 inch, thus supporting the majority of the cross-sectional dimension of the 0.375 inch insert. As can be seen in FIG. 9, the support surface 92 has a substantially smaller dimension.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. A rotatable cutting knife arrangement, comprising:

a rotary body;

a plurality of cutting knife inserts;

the body including an outer peripheral portion including a plurality of cavities, for at least partially receiving said cutting knife inserts, with the cavities defined by said adjacent cavity walls for supporting adjacent faces of said cutting knife inserts;

said outer peripheral portion includes a plurality of holder devices attached to said body, said holder devices including a bottom surface facing toward the center of the rotary body;

said cutting knife inserts comprising blocks of cutting material having a generally rectangular cross-sectional shape and forming cutting edges at each of the corners of the rectangular cross-section;

said cavity walls aligned along non-radial, non-tangential directions with respect to said rotary body so as to align said cutting knife insert, with a second cutting edge outwardly protruding for cutting operations;

a threaded fastener releasably securing said cutting knife inserts to said body is as to be held in contact with said cavity walls and cooperating with said cutting knife insert and said body cavities so as to allow said cutting knife inserts to be removed and rotationally indexed to present a different outwardly protruding cutting edge;

a plurality of bias members between said holder devices and said body to resiliently support said cutting knife inserts; and said cavity walls defining a gap to receive corner portions of said cutting knife inserts, so as to maintain said corner portions of the cutting knife inserts out of contact with the support surfaces.

2. A rotatable cutting knife arrangement according to claim 1 wherein said holder devices have an upper surface and said cavity walls form a generally V-shaped cavity comprising said gap, extending from said upper surface, for receiving corner portions of said cutting knife inserts.

3. A rotatable cutting knife arrangement according to claim 1 wherein said holder devices are removably attached to said body.

4. A rotatable cutting knife arrangement according to claim 1 wherein said plurality of holder devices are substantially identical to one another.

5. A rotatable cutting knife arrangement according to claim 4 wherein said plurality of cutting knife inserts are substantially identical to one another.

6. A rotatable cutting knife arrangement according to claim 1 wherein said cutting edges are hardened with an outer hardening layer of either ZrN, TiN, CrN, or ARCLYATHON material.

7. A rotatable cutting knife arrangement according to claim 1 wherein said holder includes an upper surface which is generally flat, and aligned parallel to a tangent to an outer surface of said rotary body, and said cutting knife insert forms an angle of generally 45 degrees with the upper surface of said holder device.

8. Apparatus for use in preparing a continuous web of food product for packaging, the food product including a soft food wrapped in a continuous wrapper, the apparatus comprising:

a rotary anvil having an outer surface; and a rotary cutting knife arrangement opposite said rotary anvil and spaced therefrom to form a nip for receiving said web;

said rotary cutting knife arrangement including a rotary body, a plurality of cutting knife inserts, said outer peripheral portion includes a plurality of holder devices attached to said body, said holder devices including a bottom surface facing toward the center of the rotary body, said cutting knife inserts comprising blocks of cutting material having a generally rectangular cross-sectional shape and forming cutting edges at each of the corners of the rectangular cross-section, the body including cavity walls for supporting adjacent faces of said cutting knife inserts, said cavity walls aligned along non-radial, non-tangential directions with respect to said rotary body so as to align said cutting knife insert, with a second cutting edge outwardly protruding for cutting operations;

a threaded fastener releasably securing said cutting knife inserts to said body so as to be held in contact with said cavity walls and cooperating with said cutting knife insert and said cavity walls so as to allow said cutting knife inserts to be removed and rotationally repositioned with respect to said cavity walls so as to present a different cutting edge to said rotary anvil, a plurality of bias members between said holder devices and said body to resiliently support said cutting knife inserts; said cavity walls defining a gap to receive corner portions of said cutting knife inserts, so as to maintain said corner portions of the cutting knife insert out of contact with the support surfaces; and said rotary anvil and said rotary cutting knife arrangement cooperating to sever a wrapped portion of said soft food from said web.

9. The apparatus of claim 8 further comprising a voider-sealer at which portions of the soft food are separated within the wrapper, with the wrapper being sealed between the separated portions of soft food, said voider-sealer receiving said web upstream of said nip and said rotary anvil and said rotary cutting knife arrangement cooperating to sever the web at the sealed portions of said wrapper.

10. Apparatus for producing packaged individual food portions in which spaced-apart portions of a soft food product, disposed within a continuous wrapper web and separated by sealed portions of the wrapper web, are formed by severing the wrapper web, the apparatus comprising:

a rotary anvil having an outer surface; and a rotary cutting knife arrangement, carrying a plurality of cutting knife inserts comprising blocks of cutting material having a generally rectangular cross-sectional shape and forming cutting edges at each of the corners of the rectangular cross-section, said rotary cutting knife arrangement opposing said rotary anvil and spaced therefrom to form a nip for receiving said web;

said rotary cutting knife arrangement including a rotary body having cavity walls for supporting adjacent faces of said cutting knife inserts, said outer peripheral portion includes a plurality of holder devices attached to said body, said holder devices including a bottom surface facing toward the center of the rotary body, said cavity walls aligned along non-radial, non-tangential directions with respect to said rotary body so as to align said cutting knife inserts, with a first cutting edge outwardly protruding so as to cooperate with said rotary anvil, a threaded fastener releasably securing said cutting knife inserts to said body so as to be held in contact with said cavity walls and cooperating with said cutting knife inserts and said cavity walls so as to allow said cutting knife inserts to be removed and rotationally repositioned with respect to said cavity walls so as to present a different cutting edge to said rotary anvil, a plurality of bias members between said holder devices and said body to resiliently support said cutting knife inserts, and said cavity walls defining a gap to receive corner portions of said cutting knife inserts, so as to maintain a second corner portion of the cutting knife inserts out of contact with the support surfaces; and said rotary anvil and said rotary cutting knife arrangement cooperating to pass portions of the wrapper web containing the soft food product and to sever sealed portions of said wrapper web.

11. Apparatus according to claim 10 wherein said holder device has a base portion defining an array of spring-receiving cavities.

12. Apparatus according to claim 10 wherein said cutting knife insert is repositionable in four different positions with respect to said cavity walls, such that the cutting edges of the insert protrude generally equal amounts from the rotary body.

13. A rotatable cutting knife arrangement according to claim 10 wherein said holder includes an upper surface which is generally flat, and aligned parallel to a tangent to an outer surface of said rotary body, and said cutting knife insert forms an angle of generally 45 degrees with the upper surface of said holder device.

14. A method of processing a continuous web of food product comprising spaced apart portions of soft food wrapped in a continuous wrapper, comprising the steps of:

providing an anvil roller;

providing a cutting roller having a plurality of indexable cutting knife inserts protruding toward the anvil roller;

providing the indexable cutting knife inserts with a generally rectangular cross section with cutting edges at each of the corners of the rectangular cross section;

removably attaching the indexable cutting knife inserts to the cutting roller;

forming a nip between the anvil roller and cutting roller;

passing the web of food product through the nip;

cutting the web at points between portions of soft food to separate a portion of food product from the web; and removing the cutting knife inserts from the cutting roller, rotating and re-securing the cutting knife insert at periodic intervals to present a new cutting edge for severing the web.

15. The method of claim 14 further comprising the step of passing the continuous web through a voider-sealer station at which portions of the soft food are separated within the wrapper, with the wrapper being sealed between the separated portions of soft food.

16. The method of claim 14 further comprising the steps of:

providing a continuous ribbon of said soft food product;

providing a web of wrapper material;

disposing said continuous ribbon of said soft food product in said web of wrapper material to form said continuous web of food product;

providing a voider-sealer at which portions of the soft food are separated within the wrapper, with the wrapper being sealed between the separated portions of soft food, positioning said voider-sealer upstream of said nip; and passing said web of food product through said nip with said rotary anvil and said rotary cutting knife arrangement cooperating to sever the web at the sealed portions of said wrapper.

17. The method according to claim 14 wherein said wrapper is comprised of a polymer film.

* * * * *

UNITED STATES PATENT AND TRADEMARK OFFICE
CERTIFICATE OF CORRECTION

PATENT NO. : 6,481,318 B1 
DATED : November 19, 2002
INVENTOR(S) : Panagiotis Kinigakis et al.

It is certified that error appears in the above-identified patent and that said Letters Patent is hereby corrected as shown below:

Title page,
Item [73], change "Kraft Food Holdings, Inc." to -- Kraft Foods Holdings, Inc. --

Signed and Sealed this

Sixth Day of May, 2003

JAMES E. ROGAN
*Director of the United States Patent and Trademark Office*